United States Patent [19]
Buchner et al.

[11] 3,792,873
[45] Feb. 19, 1974

[54] PASSIVE RESTRAINT SYSTEM FOR VEHICLE OCCUPANTS

[75] Inventors: Gerhard Paul Buchner, Richterich by Aachen; Hubertus Paulus Thomaschewski, Aachen, both of Germany

[73] Assignee: Uniroyal A.G., Aachen, Germany

[22] Filed: Jan. 17, 1972

[21] Appl. No.: 218,184

[30] Foreign Application Priority Data
Feb. 5, 1971 Germany.......................... 2105428

[52] U.S. Cl. ............. 280/150 AB, 5/348, 139/389, 182/137
[51] Int. Cl. ............................................ B60r 21/08
[58] Field of Search ..........280/150 AB; 244/138 R; 5/348, 349; 139/387, 389, 390; 128/DIG. 20

[56] References Cited
UNITED STATES PATENTS

| | | | |
|---|---|---|---|
| 3,638,755 | 2/1972 | Sack | 280/150 AB |
| 3,675,942 | 7/1972 | Huber | 280/150 AB |
| 2,974,912 | 3/1961 | Namsick | 244/138 R |
| 3,008,214 | 11/1961 | Foster et al. | 5/348 R |
| 3,125,377 | 3/1964 | Bridges | 5/348 R |
| 3,610,657 | 10/1971 | Cole | 280/150 AB |
| 3,582,107 | 6/1971 | Goetz et al. | 280/150 AB |
| 2,361,242 | 10/1944 | Rosett | 128/DIG. 20 |
| 3,360,014 | 12/1967 | Poisson et al. | 139/389 |
| 3,618,977 | 11/1971 | Klove, Sr. | 280/150 AB |
| 3,632,133 | 1/1972 | Hass | 280/150 AB |

Primary Examiner—David Schonberg
Assistant Examiner—John P. Silverstrim
Attorney, Agent, or Firm—Robert J. Patterson, Esq.

[57] ABSTRACT

Safety apparatus for protecting an occupant of a vehicle during an accident comprising a confinement, or so-called "air bag", inflatable from a collapsed condition to an expanded condition in which it is adapted to restrain movement of the occupant relative to the vehicle during an accident, and means for effecting expansion of the confinement to the expanded condition by introducing a gas under pressure, typically compressed air or gas generated pyrotechnically, from an outside source into the confinement. The wall of the confinement is made of uninterruptedly woven fabric in tubular form which constitutes a member which completely encircles the inflating gas. The encircling wall of the confinement can be made from a circular woven tubular fabric member woven on a circular loom or from a double woven fabric made on a loom in the well-known manner by carrying out the weaving process in such a way that adjacent portions of fabric are interwoven together.

8 Claims, 11 Drawing Figures

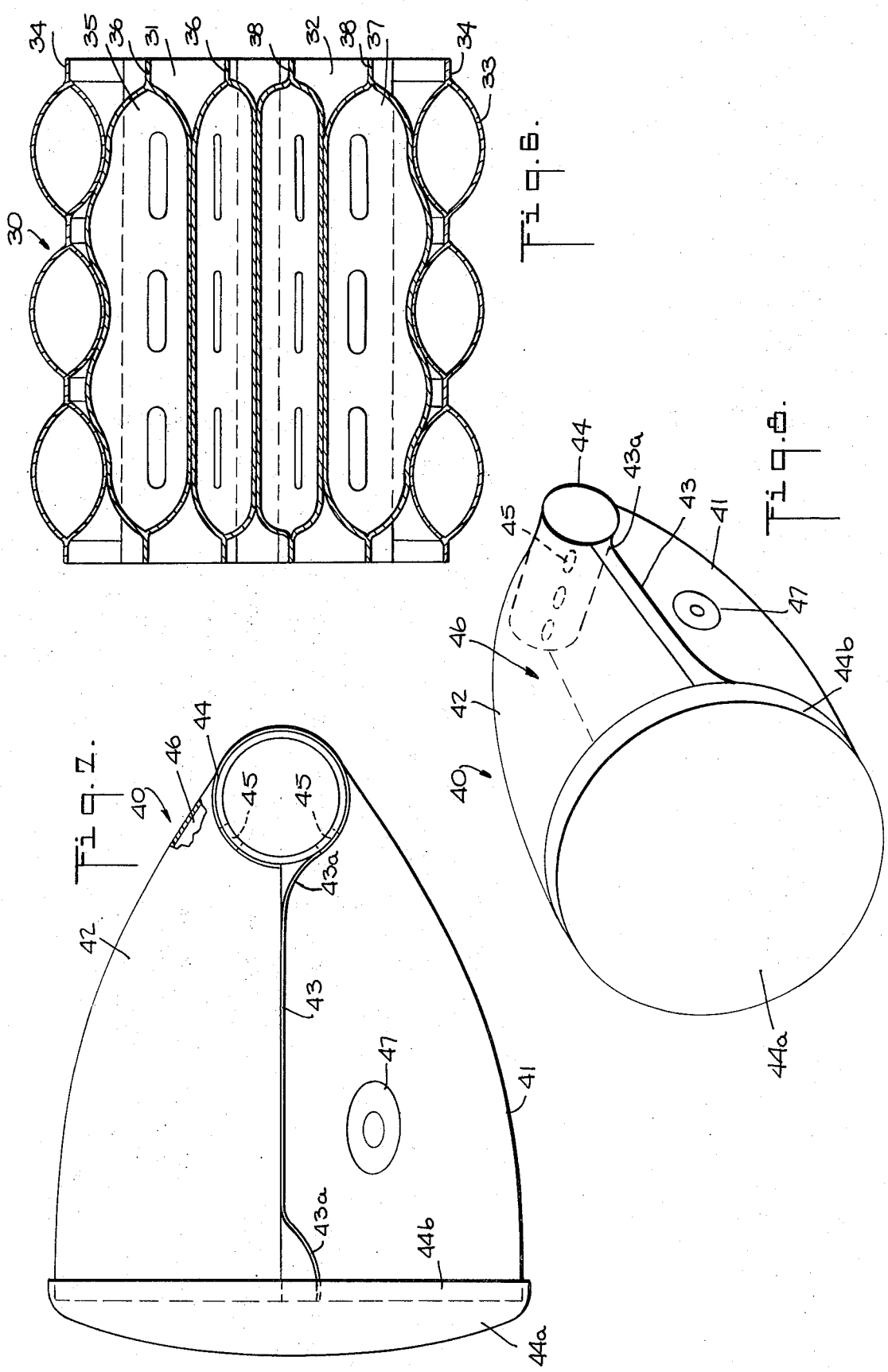

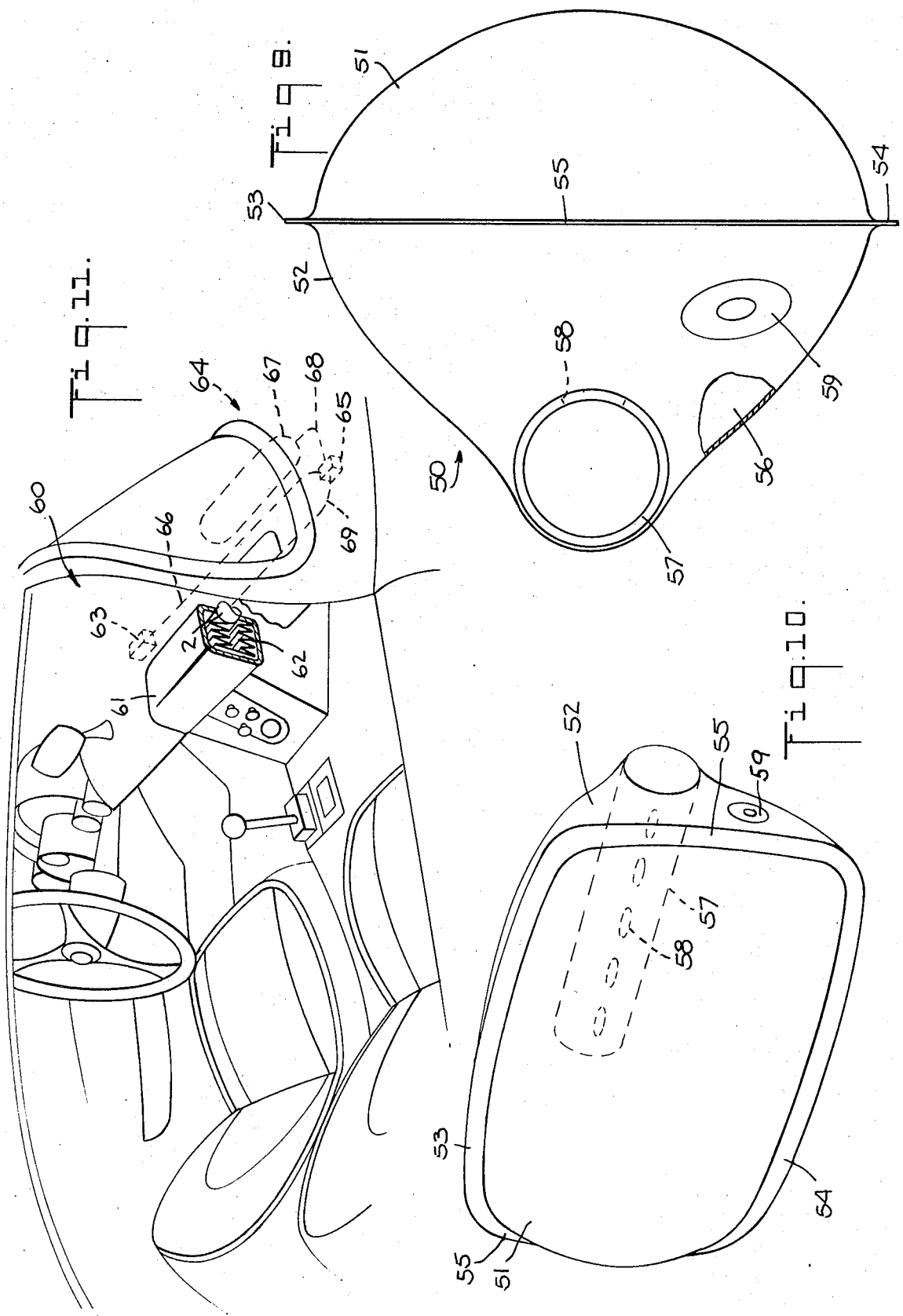

PASSIVE RESTRAINT SYSTEM FOR VEHICLE OCCUPANTS

BACKGROUND OF THE INVENTION

The invention pertains to a safety device for vehicles, particularly motor vehicles, for reducing or preventing the impact of the passengers against hard surfaces of the vehicle, comprising at least one fabric container (often called an air bag or simple a "confinement") which in the resting state is folded up into the smallest possible area, but upon danger of impact can be automatically blown up from a source of gas under pressure.

Safety devices of this type have already become familiar in various embodiments. Thus, for example, according to the prior art, for example German Patent No. 896,312, a collapsible, elastic and highly air-impermeable container is connected to a compressed air container or to a source of gas generated pyrotechnically, by way of a valved line. The inflation of the container can be effected manually, but is more commonly effected automatically at the time of vehicle impact. The container generally extends transversely to the direction of travel.

German Auslegeschrift No. 1,280,072 teaches a safety device of this type in which the container is made of at least two expandable parts connected by one or more sewn seams, and in which, in order to strengthen the seams connecting the parts, an equalizing chamber surrounding the seams is provided. As a result, the parts of the container connected at the edges by sewing are supposed to be protected from breaking under the influence of the rapid inflation process. This equalizing chamber is supposed to surround the main seam and relieve the strain on it. Although the main seam may break at the time of impact, the gas pressure may not escape altogether, since the equalizing chamber takes up the gas pressure. In order to seal the seams, they are typically coated with rubber or other adhesives in the usual way.

Containers of the type in question must be collapsible to the smallest possible size in the resting state and the container material as well as the seam must not age to a deleterious extent despite years of storage in the resting state, so that in case of need, the containers will actually represent a functional safety device. On the other hand, if such a safety device is to gain general application, it must be extremely easy and cheap to manufacture so that it can be made by mass production.

SUMMARY OF THE INVENTION

In its broadest aspects, the present invention is an air bag or confinement, and a passive restraint system comprising the same, the confinement being made of uninterruptedly woven fabric in tubular form. The woven fabric in tubular form can be made by well-known circular weaving techniques using a circular loom. Alternatively, it can be made as a double fabric by weaving on a flat loom in the well-known manner by which adjacent portions of the fabric are interwoven during the weaving process. The use of either type of uninterruptedly woven fabric in tubular form for confining the inflating gas eliminates the disadvantages attendant upon making seams by sewing or by the use of common bonding techniques using rubber or other adhesives. The present invention eliminates the weakness of sewn or bonded seams. As a result, the efficacy and reliability of confinements of the present invention and restraint systems utilizing same are significantly improved because the strength of the tubular portion or portions of the confinement which are made from uninterruptedly woven fabric is at all points at least equal to the strength of the fabric itself.

The principal objective of the present invention is to further develop a confinement in such a manner that it can be manufactured easily and very cheaply and nevertheless guarantees a strength throughout the area formed of the uninterruptedly woven fabric at least equal to that of the fabric itself. This result is achieved equally with circular woven tubular fabric made on the ordinary circular loom and double fabric made by the well-known double weaving technique on a flat loom whereby adjacent portions, e.g. edges, of woven fabric are woven together. In the latter case, the strength in the doubly woven areas is at least equal to the strength of the fabric itself and the mutual interweaving of the portions of fabric in the connection regions is accomplished with rapidly operating, inexpensive methods and equipment well-known in the weaving art. Thus, no special additional measures are required for closing seams.

It is particularly advantageous if the sections of fabric are interwoven on the loom in narrow regions between their edges to form separate chambers, so that in addition to the interwoven seams at the edges of the fabric sheets, the two fabric sheets are also tightly bound together by interweaving in intermediate areas, so that the various independent chambers are created between the two sheets of fabric. This is particularly advantageous, since, depending on the place in the vehicle in which the containers are used, the requirements placed on the strength of the blown-up container on the one hand and the requirements with reference to the release of the inflation pressure for taking up the further impact pressure of the body of the vehicle occupants by means of appropriately constructed valves of known type are extremely complicated and difficult to meet. By subdividing the container into various chambers and varying the dimensions and arrangements of the chambers by appropriate location of the interwoven connecting areas, the present invention enables these requirements to be fulfilled in a practically optimal manner.

For the case in which the container is required solely in tubular form without intermediate chambers, as an alternative to the foregoing, the container can advantageously consist of one or more circular woven tubular portions, of whose open ends at least one is connected to a diffusor connected to the source of gas under pressure.

Moreover, for many applications, it is preferable to use a container with several chambers made of a double fabric which is interwoven on the loom at its edges and, if desired, at intermediate regions as well, since use of such a container facilitates adaptation of the safety device to practical requirements.

BRIEF DESCRIPTION OF THE DRAWINGS

In the accompanying drawings, which portray in schematic form several embodiments of the present invention;

FIG. 6 is a cross section through the safety device of FIG. 5 along line 6—6 thereof;

FIG. 7 is a side view of a simplified embodiment of safety device in accordance with the present invention;

FIG. 8 is a perspective view of the embodiment of FIG. 7;

FIG. 9 is a side view of another simplified embodiment of safety device of the invention;

FIG. 10 is a perspective view of the embodiment of FIG. 9; and

FIG. 11 is a schematic in situ view showing a safety system of the invention installed in an automobile.

DESCRIPTION OF THE PREFERRED EMBODIMENTS

Figure 1:
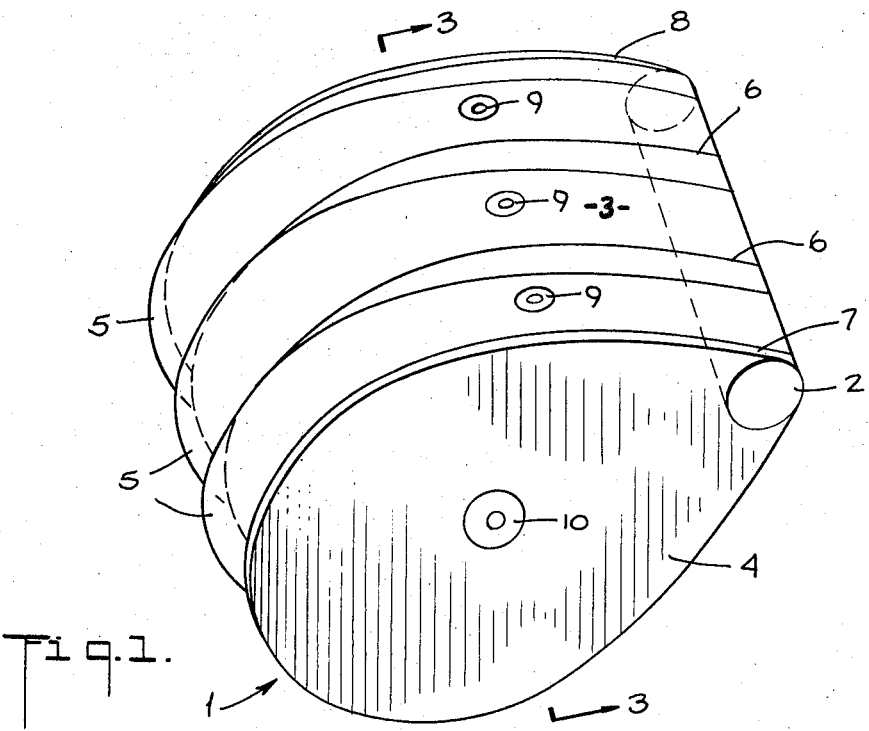
FIG. 1 is a perspective view of one form of safety device constructed in accordance with the present invention.
Figure 2:
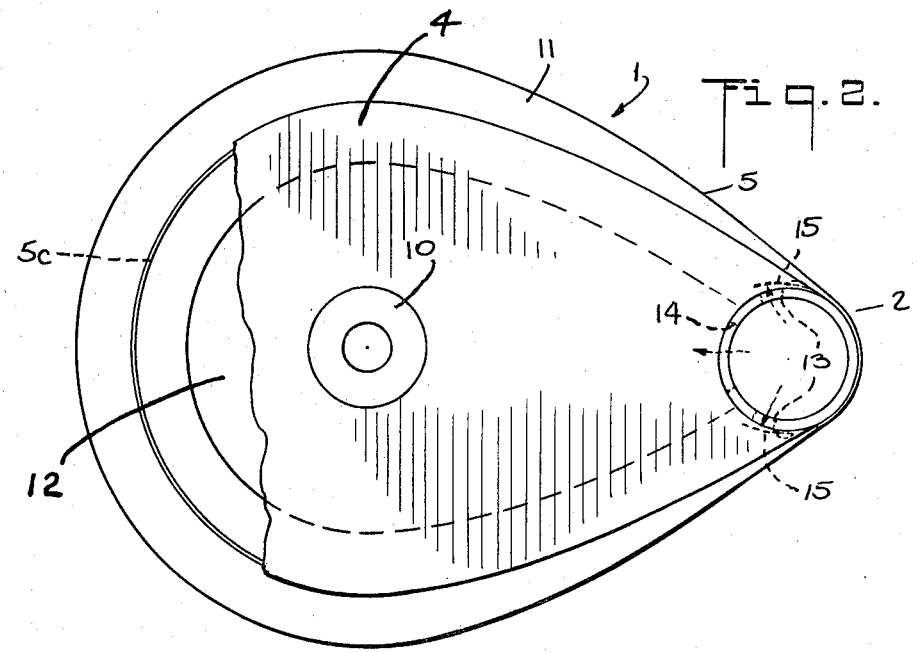
FIG. 2 is a side view of the safety device of FIG. 1.
Figure 3:
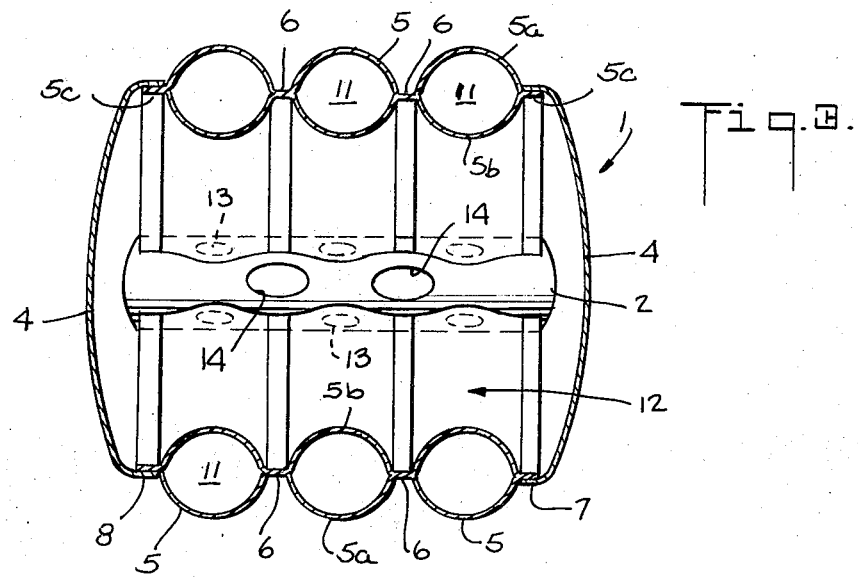
FIG. 3 is a transverse section through the safety device of FIG. 1, taken on the line 3—3 thereof.

Referring now to FIGS. 1 through 3, the safety device 1 of the embodiment illustrated consists of a distributor or a diffuser tube 2, which is connected in a suitable manner to a suitable source (not shown) of inflating gas under pressure, and a container or confinement formed by parts 3, 4 and 5. The diffusor tube 2 simultaneously serves as a means of holding the container which is shown in the drawings in the inflated state in order to make its details more readily recognizable.

In the embodiment of FIGS. 1 to 3, a plurality of outside loop compartments formed in side by side relationship from a double fabric woven flat on the loom and having adjacent portions interwoven at its edges and at intermediate portions surround an inner compartment; all of the compartments are connected to an inflating gas diffusor; this arrangement makes it easily possible to effect sequential inflation of the loop compartments and the inner compartment enclosed thereby.

The container of FIGS. 1 through 3 comprises a loop-like outer section of double fabric which comprises single fabrics 5a and 5b which are interwoven on the loom at the edges 5c and at intermediate portions 6 and which enclose several chambers 11 between them, these chambers running in the direction of the loop. The individual loop-like chambers 11 are separated from one another by means of connecting seams 6 which are formed by weaving together superimposed, narrowly limited regions of the two sections of woven fabric material on the loom.

In FIGS. 1 through 3, an additional larger chamber 12 is formed within the exterior loop portion comprising chambers 11. For this purpose, the ends of the outer loop are closed by caps 4, which preferably are made from the same kind of fabric as that used in walls 5a and 5b. The caps 4 are firmly and permanently connected to the interwoven edges 5c of the loop-shaped container portion 3 by vulcanization along seams 7 and 8. To accomplish this, the adjacent marginal portions of loop container 3 and caps 4 are coated or impregnated with a vulcanizable material such as a sulfur-vulcanizable natural or synthetic rubber compounded with conventional curatives and other compounding ingredients or other curable elastomeric or plastic material such as polyurethane or the like.

As shown in FIG. 2, the loop chambers 11 and the central chamber 12 formed within the loop are connected independently from one another to the diffusor tube 2 through openings 13 and 14. In addition, at least the central chamber 12 is provided with a valve 10 of known type which closes off the central chamber 12 under the inflation pressure, but in the presence of the increased pressure due to the impact of the person on the container pillow, i.e. the confinement, opens and permits the pressure to be controllably discharged, thus elastically absorbing the impact shock of the person and preventing injury to facial and other relatively easily damaged parts of the body of the vehicle occupants. In order to maintain sufficient pressure in the container, even if several successive impact shocks occur, the pressure in the chambers 11 may be maintained. For this purpose, flap valves 15 are provided over the inlet openings 13 leading into chambers 11. However, as shown in FIG. 1, the individual chambers 11 may also contain separate discharge valves 9 known type, which may be set so as to open in response to a different pressure from that to which valve 10 responds. In addition, only certain individual ones of chambers 11 may be provided with valves 9, in order for the pressure to be maintained in the other chambers as long as necessary.

In FIGS. 1 through 3, the chambers 11 all have the same cross sectional configuration. It will be obvious that if desired more or fewer of such chambers can be formed one adjacent the other between the two sections of interwoven fabric from which they are made. By varying the distances between the fabric connections 6, and even the widths of such connections, the cross sectional sizes of the individual chambers can also be made to differ from one another. Thus a good possibility for adaptation to various possible applications and installations is provided. Furthermore the single fabric sections 5a and 5b of the double fabric may be woven together only along their longitudinal edges so that only a single external loop-shaped chamber 11 is formed. Instead, if desired the container section 3 may more advantageously consist of a seamless, i.e., circular-woven piece of fabric in tubular form.

The purpose, in the embodiment portrayed in FIGS. 1 to 3, in providing an inner chamber 12 encircled by an independent outer loop-chamber is to create additional efficiency of functions. Bearing in mind that vehicle collisions ordinarily do not lead to an absolute stop of the vehicle upon the first impact but are followed by subsequent shocks before the vehicle comes to a standstill, it will be seen that such subsequent shocks may potentially cause injuries of passengers. The arrangement in question makes it possible to have a first chamber inflate at the very moment of the first shock and simultaneously deflate in order to respond elastically upon the impact of the preson, this action occurring even before the vehicle reaches a complete standstill, security for subsequent impacts being provided by causing other non-deflated chambers to become effective and handle further impacts of the person.

Figure 4:
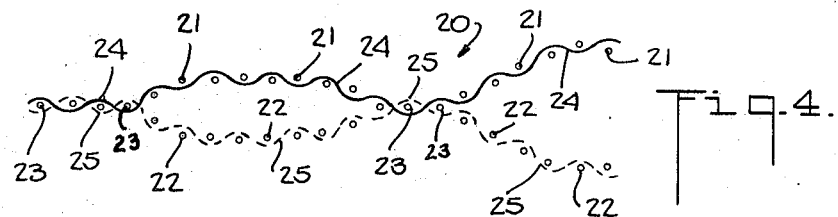
FIG. 4 illustrates, in a highly simplified manner and on an enlarged scale details of the connecting seam between two sections of fabric which are uninterruptedly woven together for use in making one type of safety device according to the invention.

FIG. 4 schematically illustrates the connection of the two sheets of woven fabric 5a and 5b in connected areas. In this figure, the two sheets of fabric of the container portion designated generally by reference numeral 20 contain warp threads 21 and 22. In the connected areas, some of the warp threads, designated 23, are jointly passed around by the woof threads 24 and 25 of the two fabric sheets, so that the two sheets of fabric are woven firmly and uninterruptedly together in the regions of the connections. Instead of using the particular type of weaving portrayed in this figure, other types of weaving can be used so long as they permit the uninterrupted interweaving of the two fabric sheets within limited regions. The selection of weaving equipment and techniques for carrying out the manufacture of the double fabrics is well within the skill of those versed in the art of weaving fabrics.

The woven fabrics used in the practice of the invention can be made from any suitable textile material, e.g. nylon, perlon, rayon, polyester or the like.

Figure 5:
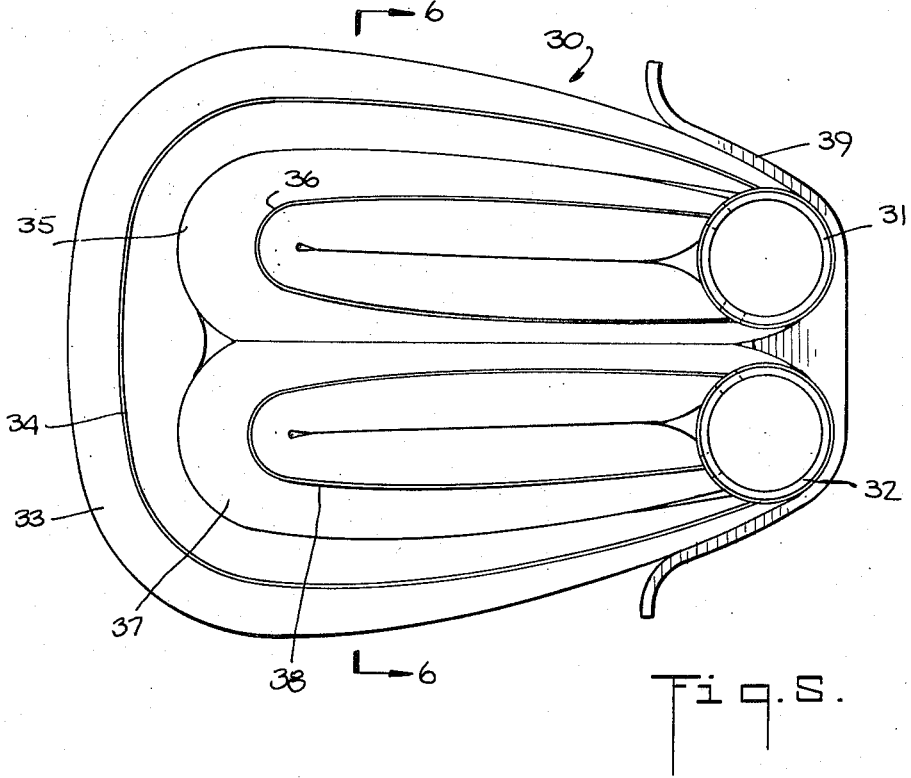
FIG. 5 is a side view of a modified embodiment of the invention in which all seams consist exclusively of uninterruptedly woven seams.

The containers may be formed from several independent and interstacked containers. An example of this is shown in FIGS. 5 and 6. The container 30 shown in those figures again comprises a loop 33 formed from a double fabric consisting of two sheets of fabric woven together in the seams and connection regions, the external interwoven seam being indicated at 34, and two additional loops 35 and 37, independent of one another, surrounded by external loop 33. Each of loops 35 and 37 is likewise made from a double fabric consisting of two sheets of fabric woven together at least at the longitudinal edges 36 and 38. The ends of the three loops 33, 35 and 36 are connected respectively to diffusor tubes 31 and 32. In the embodiment shown, two such diffusor tubes are arranged at a small distance from one another. These tubes can be disposed in a shell-like container 39 which also serves as a support. Container 39 is conveniently made of formed sheet plastic or the like. In the embodiment under discussion, each of the two inner loops 35 and 37 may be in the form of only a single pressurized chamber, whereas the outer loop 33 comprises several chambers arranged in parallel and separated by weaving connection links as in the case of the embodiment of FIGS. 1 to 3. In the embodiment of FIGS. 5 and 6, all connecting seams are formed by double weaving in the indicated manner.

The container of FIGS. 5 and 6 can also be formed from a single piece of double fabric positioned in several loops in a manner similar to that shown, e.g., in FIG. 5, the parts of the loop which contact the diffusor tubes 31 and 32 being fastened to and connected appropriately to distributor openings in the diffusor tubes.

In the two embodiments of FIGS. 1 to 6, the various chambers can also be connected to different pressure sources. It is also possible to connect the pressure chambers together by means of appropriate valves.

The fabric used in the practice of the invention may be unexpandable as well as elastically expandable. It can be made impermeable to air or gas by means of a suitable impregnation or coating. However, in most cases the fabric is allowed to retain its natural permeability to gas, as long as it is tight enough to maintain the required pressure in the container to a sufficient extent during the very brief time span of the inflation process and impact.

FIGS. 7 through 10 show two additional, simplified, embodiments of safety devices according to the invention.

In the case of the embodiment shown in FIGS. 7 and 8, once again a fabric tube consisting of two sheets of fabric 41 and 42 is provided. This tube is closed along its longitudinal edges at 43 as a result of the interweaving of the sheets of fabric as described previously. Instead, a circular woven fabric tube could also be used to form this portion of the container. One end of this fabric tube is fastened to the diffusor tube 44. The pressure chamber 46 of the container 40 is connected with the diffusor 44 by way of openings 45. In order to release the pressure in the container chamber 40, a valve 47 is provided in the wall of the container as shown.

The other end of the fabric tube is closed by a fabric cap 44a which is permanently bonded to the end of the fabric tube by vulcanization as indicated by 44b. The woven seam 43 is appropriately deflected, as shown by reference numeral 43a, at the region of the connection with the diffusor tube 44 and the cap 44a.

Referring now to the embodiment portrayed in FIGS. 9 and 10, a fabric tube of the same type as that shown in FIGS. 7 and 8, with its fabric strips 51 and 52 interconnected along the woven edges 53 and 54 which are arranged parallel to the axis of the diffusor tube 57, is provided. Thus fabric strip 52 surrounds the diffusor tube 57 and connects the pressure chamber 56 of the container with the interior of the diffusor tube by way of openings 58. The seams 55, which run perpendicular to the woven seams 53 and 54 of the container 50 are vulcanized together, after the corresponding regions of the fabric have been coated with a vulcanizable material of the same type as that mentioned above. Reference numeral 59 indicates a pressure discharge valve of the type described above secured to fabric portion 52.

As will be obvious, the various embodiments described herein can be combined with one another. Thus, a container made according to FIGS. 7 and 8 or according to FIGS. 9 and 10 may be fitted into a container loop according to FIGS. 1 through 3 to form the central chamber. In this way the caps 4 of the loop-shaped part of the container of the embodiment of FIGS. 1 through 3 can be eliminated.

In this connection, it should also be pointed out that in the case of containers fitted into one another, the chambers located on the outside do not serve as strain-relief chambers for the seams of the inner chamber, since they are likewise inflated at full pressure and are provided in order to fulfill a function independent of the inner container.

The loop-like structure of at least one part of the containers made according to FIGS. 1 through 3 and 5 and 6 has the particular advantage that the open ends of the tubular fabric can be permanently attached to the diffusor tube, and at least the chambers formed in this part of the container are closed with respect to the outside and with respect to one another by uninterruptedly woven seams alone, thus guaranteeing a strength in the seam area corresponding to the strength of the fabric at the other points. In this manner, an extremely high degree of security against damage to the seams and against leakage of the container is obtained. In addition, the uninterruptedly woven seams can be folded up for storage almost as easily and compactly as the fabric itself. Furthermore, the uninterruptedly woven seams used in the containers of the present invention undergo no aging which is different from that of the fabric itself, so that the safety device retains its complete functioning ability even after long periods of storage in the resting state.

Referring now to FIG. 11, the cockpit of a motor vehicle is generally represented by arrow 60. A compartment 61 on the dash of the cockpit contains a confinement or bag 62 of the present invention in folded, uninflated condition. In the event of a crash, a sensor 63 of well-known type is activated. Sensor 63 is located on the firewall of the vehicle generally in the area indicated by arrow 64. Sensor 63 is connected to a valve 65 through connection 66. When activated, sensor 63 sends a signal or otherwise causes valve 65 to open. A container 67 of fluid and/or gas under pressure is also situated in the immediate area of the firewall and is connected to valve 65 by means of conduit 68. Container 67 is caused to release its fluid or gas through open valve 65 and thereby to inflate confinement 62 at the instant of collision. The inflating medium is transported by conduit 69 into diffusor 2 causing confinement 62 to be released from compartment 61 and to be inflated. A passenger seated in cockpit 60 will move into engagement with the expanded confinement and be restrained relative to the vehicle so as to avoid injury. The confinement is, in accordance with conventional practice, designed so that after the introduction of inflating fluid or gas is discontinued, the confinement will deflate by the automatic operation of valves in the wall of the confinement such as valves of the type described above. In addition, the confinement may be made at least partially from gas-permeable fabric so that limited deflation is taking place even while it is expanding, thereby reducing the shock of impact between passenger and inflated confinement.

From the foregoing it will be seen that the present invention, as a result of the construction of the confinement from uninterruptedly woven fabric, effects significant advantages in the art of passive restraint systems using confinements. The advantages of the present invention are achieved to the greatest extent when all of the seams of the confinement are made from uniterrruptedly woven fabric. However, it will be seen from the foregoing description and the drawings that with certain configurations of confinements it is not possible to completely avoid the use of other types of seams, that is seams which are sewed or bonded. Sewed seams may fail to withstand the blow of inflation and bonded seams may fail due to premature ageing. For highest reliability therefore it is desirable that the use of sewed or bonded seams be kept to a minimum.

The fabric containers (so-called air bags) may be secured to the diffusor tubes in any well-known manner as by means of adhesive bonding or heat sealing, by rivets or screws, by sewing in cases where the diffusor tubes are made of appropriate material such as nylon to allow sewing, or by any other suitable mechanical fastening means.

We claim:

1. A confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable closed compartments, and at least one inflatable closed inner compartment encircled by said outer assembly.

2. A confinement having an outer assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interowven areas form said tubular looped inflatable compartments, and at least one inflatable closed inner compartment which is encircled by said outer assembly and is formed by said outer assembly and by cap portions of woven fabric which are bonded to and which extend over the looped interwoven edges of said double woven fabric, said cap portions forming the ends of said inner compartment.

3. A confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable closed compartments, and at least one inflatable closed inner compartment which is encircled by said outer assembly and is formed from a tubular object made of woven fabric which is uninterruptedly woven over its entire area encircling gas under pressure when inflated.

4. A confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of the said fabric which lie between the interwoven areas form said tubular looped inflatable closed compartments, and two vertically superimposed longitudinally extending looped compartments encircled by said outer assembly, each of said encircled compartments being formed of a section of double woven fabric interwoven longitudinally at its edges in such a way that it forms a tubular looped compartment.

5. A safety apparatus for protecting an occupant of a vehicle during a collision, said safety apparatus comprising a confinement inflatable from a collapsed condition to an expanded condition in which said confinement is adapted to restrain movement of the occupant relative to the vehicle during a collision, said confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable closed compartments, and at least one inflatable closed inner compartment encircled by said outer assembly, both ends of each of said tubular looped compartments being connected to a gas diffusor and said inner compartment or compartments also being connected to a gas diffusor.

6. A safety apparatus for protecting an occupant of a vehicle during a collision, said safety apparatus comprising a confinement inflatable from a collapsed condition to an expanded condition in which said confinement is adapted to restrain movement of the occupant relative to the vehicle during a collision, said confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable closed compartments, and at least one inflatable closed inner compartment which is encircled by said outer assembly and is formed by said outer assembly and by cap portions of woven fabric which are bonded to and which extend over the looped interwoven edges of said double woven fabric, said cap portions forming the ends of said inner compartment, both ends of said tubular looped compartments being connected to a gas diffusor and said inner compartment or compartments also being connected to a gas diffusor.

7. A safety apparatus for protecting an occupant of a vehicle during a collision, said safety apparatus comprising a confinement inflatable from a collapsed condition to an expanded condition in which said confinement is adapted to restrain movement of the occupant relative to the vehicle during a collision, said confinement having an outer looped assembly comprising a series of longitudnally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable closed compartments, and at least one inflatable closed inner compartment which is encircled by said outer assembly and is formed from a tubular object made of woven fabric which is uninterruptedly woven over its entire area encircling gas under pressure when inflated, both ends of said tubular looped compartment being connected to a gas diffusor and said inner compartment or compartments also being connected to a gas diffusor.

8. A safety apparatus for protecting an occupant of a vehicle during a collision, and safety apparatus comprising a confinement inflatable from a collapsed condition to an expanded condition in which said confinement is adapted to restrain movement of the occupant relative to the vehicle during a collision, said confinement having an outer looped assembly comprising a series of longitudinally extending tubular looped inflatable closed compartments in side-by-side parallel relationship, said assembly being formed from a section of double woven fabric interwoven longitudinally at its edges and along spaced parallel areas between its edges, said double woven fabric being looped in such a way that the portions of said fabric which lie between the interwoven areas form said tubular looped inflatable compartments, and two inflatable closed vertically superimposed longitudinally extending looped compartments encircled by said outer assembly, each of said encircled compartments being formed of a section of double woven fabric interwoven longitudinally at its edges in such a way that it forms a tubular looped compartment, both ends of said tubular looped compartments which constitute said outer assembly being connected to a gas diffusor and both ends of said encircled compartments also being connected to a gas diffusor.

* * * * *